United States Patent
Völkel

(10) Patent No.: US 7,062,405 B2
(45) Date of Patent: Jun. 13, 2006

(54) MONITORING OF MEASURING SIGNAL, IN PARTICULAR IN AUTOMATION TECHNOLOGY

(75) Inventor: Thomas Völkel, Bad Steben (DE)

(73) Assignee: Siemens Aktiengesellschaft, Munich (DE)

(*) Notice: Subject to any disclaimer, the term of this patent is extended or adjusted under 35 U.S.C. 154(b) by 44 days.

(21) Appl. No.: 10/729,202

(22) Filed: Dec. 5, 2003

(65) Prior Publication Data

US 2004/0133387 A1    Jul. 8, 2004

Related U.S. Application Data

(63) Continuation of application No. PCT/DE02/02477, filed on Jul. 5, 2002.

(30) Foreign Application Priority Data

Jul. 12, 2001    (DE) ................ 101 34 013

(51) Int. Cl.
G04G 5/00    (2006.01)
G04G 7/00    (2006.01)
G04G 15/00    (2006.01)
G06F 15/00    (2006.01)

(52) U.S. Cl. .................................... 702/176

(58) Field of Classification Search ........ 702/176–178, 702/189, 79, 89, 125, 187
See application file for complete search history.

(56) References Cited

U.S. PATENT DOCUMENTS

| | | | |
|---|---|---|---|
| 4,908,746 A | 3/1990 | Vaughn | |
| 5,177,695 A * | 1/1993 | Sung et al. | 700/297 |
| 5,768,119 A | 6/1998 | Havekost et al. | |
| 5,920,617 A * | 7/1999 | Berger et al. | 379/169 |
| 5,973,643 A * | 10/1999 | Hawkes et al. | 342/457 |
| 5,978,746 A | 11/1999 | Beneteau et al. | |
| 2003/0176984 A1* | 9/2003 | Owen et al. | 702/124 |

FOREIGN PATENT DOCUMENTS

| | | |
|---|---|---|
| EP | 0 810 556 A2 | 3/1997 |
| WO | 03/007099 A1 * | 1/2003 |

* cited by examiner

*Primary Examiner*—John Barlow
*Assistant Examiner*—Sujoy Kundu

(57) ABSTRACT

The invention relates to a method for monitoring at least one measuring signal, in particular for use in automation technology, production automation and process automation. Said method automatically determines and establishes an optimal time interval between measuring periods, by means of the course of a measuring signal. According to the invention, a computer system cyclically determines a characteristic value of the measuring signal in measuring periods, which are separated by a time interval, whereby a priority is automatically defined, said priority is assigned to the measuring signal and the time interval between the measuring periods is defined in accordance with the priority.

7 Claims, 2 Drawing Sheets

| P | A |
|---|---|
| P1 | continuous |
| P2 | 5 seconds |
| P3 | 10 seconds |
| P4 | 30 seconds |

| P | A |
|---|---|
| P10 | 5 minutes |
| P11 | 15 minutes |
| P12 | 30 minutes |
| P13 | 45 minutes |
| P14 | 60 minutes |
| P15 | 180 minutes |

MONITORING OF MEASURING SIGNAL, IN PARTICULAR IN AUTOMATION TECHNOLOGY

CROSS REFERENCE TO RELATED APPLICATIONS

This application is a continuation of International Application No. PCT/DE02/02477, filed Jul. 5, 2002 and claims the benefit thereof. The International Application claims the benefits of German application No. 10134013.3 filed Jul. 12, 2001, both applications are incorporated by reference herein in their entirety.

FIELD OF INVENTION

The invention relates to a method for monitoring at least one measuring signal, in particular for use in automation technology, production automation and process automation.

BACKGROUND OF INVENTION

In industry, equipment components such as, for example, bearings, gears and motors are frequently monitored using sensors as part of the maintenance and repair regime. The monitoring is intended to indicate, for example, the current condition of the equipment component or to predict malfunctions/defects in order to avoid equipment downtimes or enable repair work to be scheduled in good time. For the purposes of monitoring, the signals supplied by the sensors are evaluated cyclically or continuously. It is not always possible to define in advance at what time intervals the respective measuring signal of a sensor has to be evaluated.

A device and a method for regulating power output are known from U.S. Pat. No. 5,177,695. In this, characteristics of a transmission function of a system for regulating power output are adjusted dynamically, whereby a sampling rate of output values of the power output regulator is variable. If an operationally non-critical change in an output value is determined compared with the preceding output value, then the sampling rate is reduced.

SUMMARY OF INVENTION

The object of the invention is to improve the automatic monitoring of measuring signals.

This object is achieved by a method for monitoring at least one measuring signal, in particular for use in automation technology, in which method a computer system cyclically determines a characteristic value of the measuring signal in measuring periods which are separated from one another by a time interval, whereby
a priority is defined automatically,
said priority is assigned to the measuring signal and
the time interval between the measuring periods is specified as a function of the priority.

Hitherto, the monitoring of equipment components was mostly performed on a cyclical basis at specified time intervals which could not be modified automatically. This previously used method includes the risk that between two measuring periods within the time interval without measurement an event may occur which may lead to an equipment failure before the start of the next measuring period if too great a time interval between the measuring periods was selected. For the purposes of continuous monitoring, high computing performance, and therefore expensive hardware, is generally required in order to process the huge volumes of data involved (vibration signals, image signals, etc.). Current computer systems (e.g. a standard PC) cannot handle such data volumes given the number of measuring points in complex installations. For this reason continuous monitoring is only performed in few cases. In order to enable more extensive installations with multiple measuring points also to be monitored using current computer hardware, it is proposed that a priority be assigned to each measuring point. The priority defines at which time intervals the signals of the measuring point measuring point are evaluated. At the lowest priority the signal is evaluated, for example, only every one hundred and eighty minutes and at the highest priority it is evaluated continuously. The gradation between the time intervals of the measuring periods can be set. The priority is defined dynamically and automatically as a function of the characteristic values of the signals. The prioritization can be handled on the basis of actual threshold values of the characteristic values, changes from the next-to-last to last characteristic value or from the trend indicated by the characteristic value pattern and a combination of the latter. The specification of the threshold values and the maximum change from characteristic value i-1 to characteristic value i as well as criteria from the overall trend can be set.

The time interval between the measuring periods of a measuring signal is advantageously reduced when the measuring signal is assigned a higher priority. Automatic definition of the priorities and the time intervals permits optimized use of the available transmission and computer capacities. In the system and method according to the invention, measuring signals currently rated as non-critical are evaluated only relatively infrequently and so impose only a minimal load on the available transmission and computer capacities. Only when such a signal previously rated as non-critical changes noticeably, will it be monitored more precisely, i.e. measured and evaluated more frequently. The time intervals are shortened so that a failure or malfunction which announces itself through the changing measuring signal can be detected and indicated in good time.

In the case of a measuring signal which changes only relatively slowly in small steps, the automatic definition of the priority is advantageously performed as a function of the characteristic value of the measuring signal. For this purpose, one or more threshold values and hence value ranges and priority levels assigned to these are defined. Depending on the value range within which a current characteristic value of the measuring signal currently lies, the associated priority can then be determined by the computer system.

In particular for measuring signals which require more precise monitoring as a result of sudden more violent fluctuations, it is proposed that the priority be defined automatically as a function of the size of the difference in the characteristic values of the measuring signal which were determined in two successive measuring periods. Starting from a previously specified size of the difference, the measuring signal is assigned a higher priority by the computer system and consequently a reduction in the time interval between the measuring periods is specified.

For the purpose of monitoring measuring signals which reveal complex patterns of progression, it is proposed that the priority is defined automatically as a function of a trend analysis performed by the computer system of the characteristic values of the measuring signal which were determined in successive measuring periods. This trend analysis may consist in a combination of the above-mentioned analyses of the value ranges or value differences. Also possible, however, are trend analyses based on the combining of multiple signals, on comparison of the characteristic values with values from tables stored in a memory of the computer system, through to trend analyses using fuzzy logic.

The definition and assignment of the priority as well as the specification of the time intervals based on this can be closely linked in time with the evaluation of the measuring signals, since the processes referred to are performed automatically, in time only as a function of the available computing power.

BRIEF DESCRIPTION OF THE DRAWINGS

The invention will be described in more detail below with reference to exemplary embodiments represented in the figures, in which.

DETAILED DESCRIPTION OF INVENTION

Figures 1, 2:
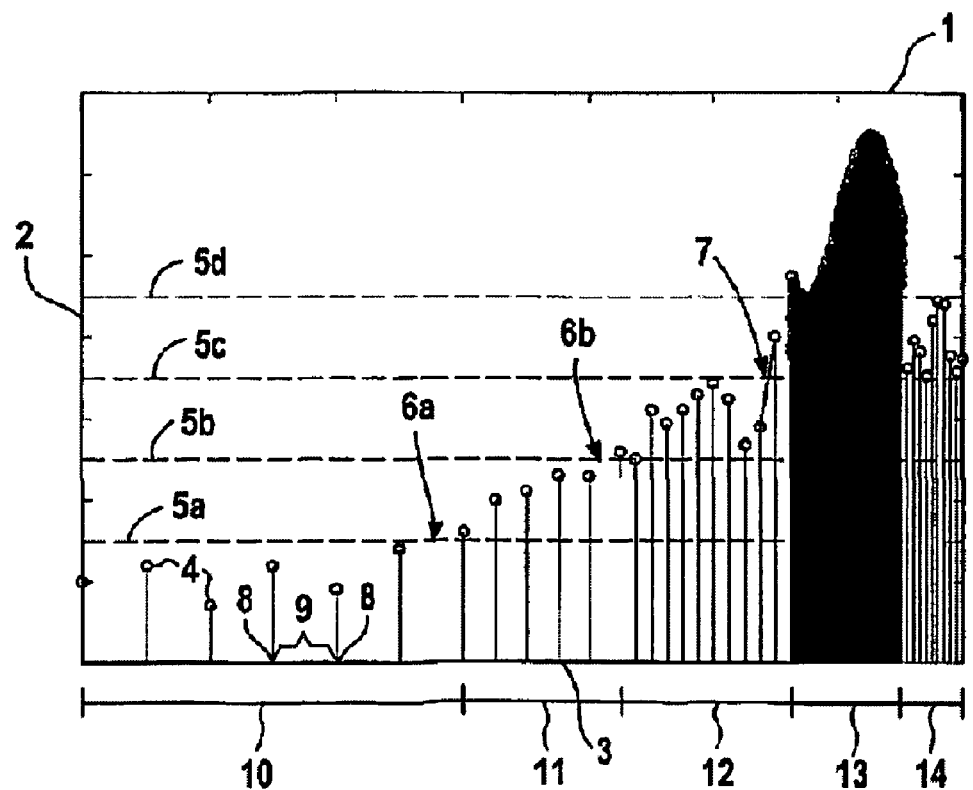
FIG. 1 shows an assignment table for specifying the assignment between priority and time interval between the measuring periods
FIG. 2 shows a pattern of the characteristic value of a measuring signal with different time intervals between the measuring periods and FIG. 3 shows a drive train with measuring points.

FIG. 1 shows an example of an assignment table for use in a method for monitoring a measuring signal. The table contains two columns P, A, the priorities P1 . . . P15 being listed in the first column P and the time intervals of the measuring periods assigned to these priorities P1 . . . P15 being listed in the second column A. The assignment table shown contains fifteen different priorities P1 . . . P15. The highest priority P1 is assigned a time interval "continuous". A measuring signal to which this priority P1 would be assigned would therefore be evaluated or sampled continuously or at the highest possible sampling rate. Measuring signals to which a lower priority P1 . . . P15 is assigned are evaluated less frequently. In the example, a measuring signal with the priority P2 is evaluated every five seconds, a measuring signal with the priority P4 every thirty seconds and finally a measuring signal with the priority P15 only every one hundred and eighty minutes. The number and designation of the priority levels as well as the time intervals of the measuring periods assigned to these are of course freely selectable in real application scenarios. Each measuring signal can be assigned a separate assignment table which is matched to this measuring signal. However, the same assignment table can also be assigned to similar measuring signals.

FIG. 2 shows an example of a pattern of the characteristic value of the measuring signal. The characteristic value of the measuring signal is plotted on the vertical axis 2, while the time is plotted on the horizontal axis 3. The characteristic values of the measuring signal plotted in diagram 1 are identified by the reference character 4. The dashed horizontal lines in diagram 1 identify threshold values 5a through 5d. Salient points in the pattern of the characteristic values are identified by the reference characters 6a, 6b and 7. Beneath the horizontal axis 3, five time periods 10 through 14 are indicated during which the priority P1 . . . P15 is constant in each case. The characteristic value 4 of the measuring signal is determined in measuring periods 8, which are separated from one another by a time interval 9. The length of such a measuring period 8 is dependent on the measuring signal to be evaluated. In the case of alternating (periodic) variables as the measuring signal to be monitored, the measuring period will lie at least in the order of magnitude of the period duration, in order to allow a characteristic value to be determined. A characteristic value is, for example, the root mean square (RMS) value, the peak value or a value determined computationally in some other form from the measurement of the momentary values of the measuring signal. In the case of aperiodic variables as the measuring signal, the length of the measuring period can be shortened down to a discrete sampling instant during which a momentary value of the measuring signal is measured or sampled and serves as the characteristic value.

Features of the method for monitoring a measuring signal are explained in more detail below with reference to FIG. 2. In the example case, the characteristic value of the measuring signal is monitored both for the exceeding of specific threshold values 5a through 5d and for the size of the difference in the characteristic values which were determined in two successive measuring periods. In the first time period 10 in diagram 1, the characteristic values 4 of the measuring signal lie below the first threshold value 5a. Within the first time period 10, the measuring signal is assigned the same priority P1 . . . P15, which makes itself noticeable by the fact that the time interval 9 is constant within the first time period 10. The first characteristic value 4 of the measuring signal in the second time period 11 lies above the first threshold value 5. When the first threshold value 5a is exceeded, the measuring signal is assigned a higher priority P1 . . . P15. This point is identified in diagram 1 by the reference character 6a. In line with the higher priority P1 . . . P15, the measuring signal is automatically assigned a smaller time interval between the measuring periods. In the example case, the time interval during the second time period 11 has halved compared with the time interval during the preceding time period 10. When a second threshold value 5b is exceeded (see point 6b in diagram 1), the priority P1 . . . P15 is again increased and consequently the time interval shortened (see third time period 12). In the example case, the difference in the characteristic values 4 of the measuring signal which were determined in two successive measuring periods 8 is also monitored, however. If this difference exceeds a specific previously specified value, the priority P1 . . . P15 is automatically increased. In the pattern of the characteristic values of the measuring signal shown in diagram 1, a point of such a large difference in values is identified by the reference character 7. If the measuring signal is assigned the highest priority P1, it is evaluated continuously, as shown in the fourth time period 13. The shown pattern of the characteristic value drops below the topmost threshold value 5d again at the start of the fifth time period 14 and is thereupon assigned a lower priority P2 with a larger time interval. Not shown in FIG. 2 is the possibility that the priority P1 . . . P15 is defined automatically as a function of a trend analysis of the characteristic values of the measuring signal which were determined in successive measuring periods, said trend analysis being performed by the computer system. Such a trend analysis can, for example, interpret the evaluation of the measuring signal pattern according to the rules of fuzzy logic. However, slower changes in the measuring signal which cannot be detected by simple threshold monitoring of the characteristic values can also be detected by means of a trend analysis.

Figure 3:
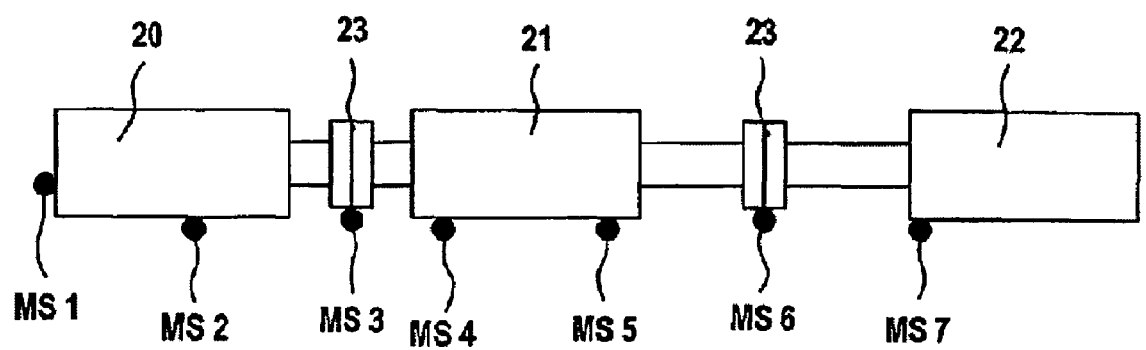

FIG. 3 shows a drive train of a rolling mill stand, consisting of a motor 20, a gearing mechanism 21, a roller 22 and connecting clutches 23. For the purpose of monitoring the drive train there are provided a number of measuring points which are designated by the reference characters MS1 through MS7. Each measuring point MS1 . . . MS7 supplies measuring signals which are evaluated using the described method for monitoring measuring signals. The proposed method can also be applied to vibration monitoring in malt mills (brewing industry), in the motor vehicle sector and for engine test benches. Further fields of application and measurement variables (current, force, image, etc.) are possible in addition to these. The method enables more complex installations to be monitored even with current computer hardware and to evaluate the measuring point at the necessary time resolution in the case of an impending breakdown.

To sum up, the invention therefore relates to a method for monitoring at least one measuring signal, in particular for use in automation technology, production automation and process automation, said method automatically determining and setting an optimal time interval between measuring periods on the basis of a measuring signal pattern. According to the invention, a computer system cyclically determines a characteristic value of the measuring signal in measuring periods 8 which are separated from one another by a time interval 9, whereby a priority P1 . . . P15 is defined automatically, said priority P1 . . . P15 is assigned to the measuring signal and the time interval 9 between the measuring periods 8 is specified as a function of the priority P1 . . . P15.

The invention claimed is:

1. A method for monitoring at least one measuring signal, for use in automation technology, in which method a computer system cyclically determines a characteristic value of the measuring signal in measuring periods which are separated from one another by a time interval, whereby
    a priority is defined automatically,
    said priority is assigned to the measuring signal and
    the time interval between the measuring periods is specified as a function of the priority, wherein
        a measuring period has a length at least equaling the order of magnitude of a period of the measuring signal if the measuring signal is an alternating period signal, and wherein
        a length of a measuring period is a discrete sampling instant at which a momentary value of the measuring signal is determined, the characteristic value including the determined momentary value if the measuring signal is a signal having an identical magnitude.

2. A method according to claim 1, wherein the priority is automatically defined as a function of the size of the difference in the characteristic values of the measuring signal which were determined in two successive measuring periods.

3. A method according to claim 2, wherein the priority is automatically defined as a function of a trend analysis performed by the computer system of the characteristic values of the measuring signal which were determined in successive measuring periods.

4. A method according to claim 1, wherein the priority is automatically defined as a function of a trend analysis performed by the computer system of the characteristic values of the measuring signal which were determined in successive measuring periods.

5. A method according to claim 1, for use in automation technology.

6. The method according to claim 1, wherein the priority is automatically defined as a function of a trend analysis performed by the computer system of the characteristic values of the measuring signal which were determined in successive measuring periods, wherein the trend analysis is based on fuzzy logic.

7. A method for monitoring at least one measuring signal, for use in automation technology, in which method a computer system cyclically determines a characteristic value of the measuring signal in measuring periods which are separated from one another by a time interval, whereby
    a priority is defined automatically,
    said priority is assigned to the measuring signal and
    the time interval between the measuring periods is specified as a function of the priority, wherein
        a length of a measuring period is a discrete sampling instant at which a momentary value of the measuring signal is determined, the characteristic value including the determined momentary value if the measuring signal is a signal having an identical magnitude.

* * * * *